June 7, 1949.  KUAN-HAN SUN  2,472,448
THALLIUM-SILICATE GLASS
Filed Aug. 9, 1946

KUAN-HAN SUN
INVENTOR

BY
ATTORNEY

Patented June 7, 1949

2,472,448

UNITED STATES PATENT OFFICE

2,472,448

THALLIUM-SILICATE GLASS

Kuan-Han Sun, Rochester, N. Y., assignor to Eastman Kodak Company, Rochester, N. Y., a corporation of New Jersey Application August 9, 1946, Serial No. 689,528

4 Claims. (Cl. 106—52)

This invention relates to glasses having unusual optical properties and specifically to silicate glass containing thallium in considerable amount.

In general flint glasses have higher dispersions or lower Abbe values, as compared to other types of optical glasses of the same refractive indices; or lower refractive indices for the same dispersions or Abbe values. It is often desirable, for optical purposes, to have glasses with even higher dispersions or lower Abbe values than those at present available. I have discovered that glasses having these desirable properties may be obtained by the use of thallium oxide component in large amounts.

Figure 1:
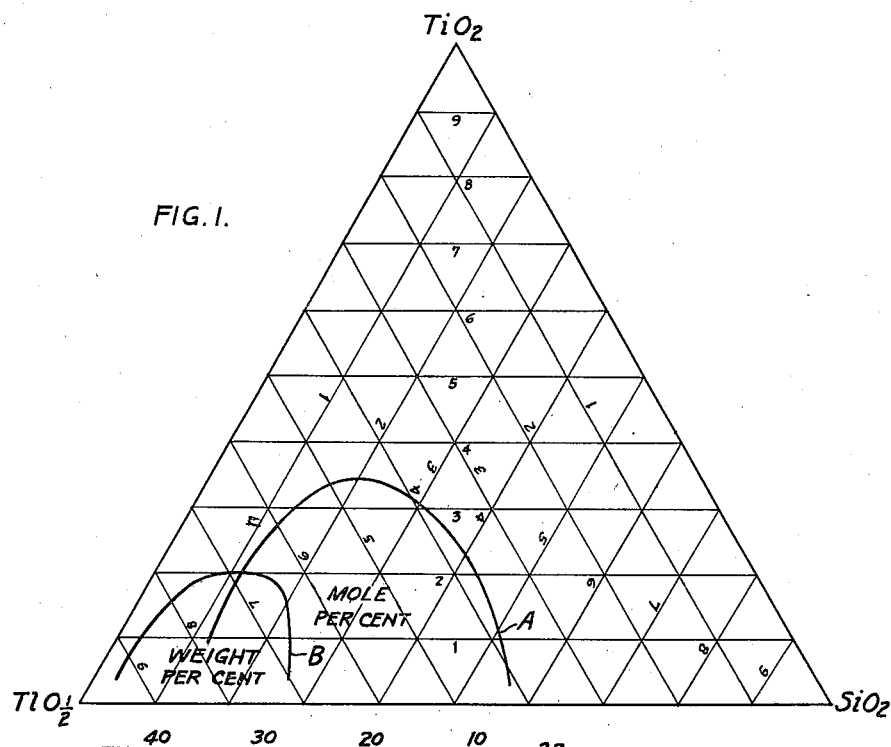

I have found particularly useful such glass having present a substantial amount of titanium oxide. A glass composed simply of the oxides of titanium, silicon, and thallium may be made and Figure 1 shows the approximate limits of glass formation of such a system in both mole and weight percentages, these being indicated by lines A and B respectively. Since $Na_2O$; $Tl_2O$; etc. are empirical formulas, it is equally expedient and more convenient to adopt the form $NaO_{0.5}$; $TlO_{0.5}$, etc.

The same information is given in tabulation form in the following table, showing the approximate limit, both in weight and mole percentages Table I

|  | Weight, per cent | Mole, per cent |
|---|---|---|
| $TlO_{0.5}$ | 64-91 | 36-79 |
| $TiO_2$ | 5-20 | 6-34 |
| $SiO_2$ | 4-28 | 10-54 |

The addition of other oxides of course changes the limits for the three given above.

Glasses may form outside these limits, but I have found that those within them are particularly valuable from the standpoint of optical properties, chemical durability, melting operations and glass formation.

In the following table are given several specific examples, W indicating weight percent, and M mole percent. The table also gives the values of the refractive index for the D line ($n_D$) and the Abbe values ($\nu$), where known; and also in the column headed "Temp." the approximate melting temperature in degrees centigrade.

Table II

| Example | $TlO_{0.5}$ | | $TiO_2$ | | $SiO_2$ | | $NaO_{0.5}$ | | $n_D$ | $\nu$ | Temp. |
|---|---|---|---|---|---|---|---|---|---|---|---|
| | W | M | W | M | W | M | W | M | | | |
| 1 | 65.0 | 38.0 | 20.0 | 31.0 | 15.0 | 31.0 | | | | | 1,100 |
| 2 | 71.0 | 43.1 | 10.0 | 16.1 | 19.0 | 40.8 | | | 1.956 | 16.5 | 1,050 |
| 3 | 88.0 | 69.8 | 5.0 | 10.5 | 7.0 | 19.6 | | | 2.225 | 10.0 | 900 |
| 4 | 40.0 | 15.0 | 20.0 | 19.8 | 30.0 | 39.6 | 10.0 | 25.6 | 1.795 | | 1,050 |
| 5 | 50.0 | 21.5 | 23.0 | 26.2 | 19.0 | 28.8 | 8.0 | 23.5 | 1.902 | 18.5 | 1,050 |
| 6 | 50.0 | 21.9 | 28.0 | 32.5 | 14.0 | 21.6 | 8.0 | 24.0 | 1.9334 | 17.8 | 1,050 |
| 7 | 55.0 | 26.4 | 25.0 | 31.8 | 15.0 | 25.4 | 5.0 | 16.4 | | | 1,100 |

As instanced in Examples 4 to 7, sodium oxide or its equivalent, potassium oxide may be introduced. Other oxides, particularly those of boron (up to 15 weight per cent or 40 mole per cent) or aluminum (up to 10 weight per cent or 15 mole per cent) or columbium, and tantalum, may also be included, the last two mentioned being substituted for titanium in whole or in part. Such additions may improve the qualities of the glass such as chemical and physical durability, and avoidance of devitrification. When additional oxides are included, the amount of oxides mentioned in Table I, is less than the range therein specified.

Figure 2:
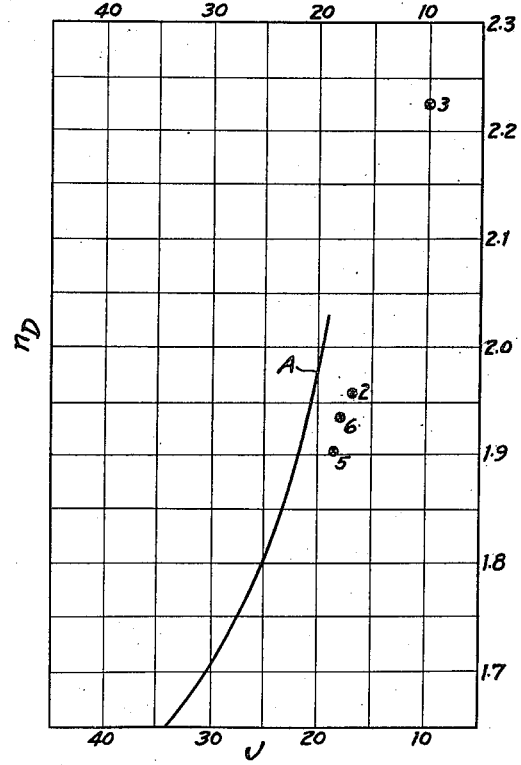

Figure 2 is a chart the coordinates of which are $n_D$ and $\nu$, showing at line A the approximate limit of the values of commercially available glasses. The points designated 2, 3, 5 and 6, show the values given in Table II for the examples similarly numbered. This shows graphically the unusual optical properties of these glasses.

Since thallium compounds, particularly in vapor form, attack platinum rapidly, these glasses are melted in vessels of high silica glass. As is usual in glass-making the ingredients may be introduced in compounds other than the oxides, being transformed in the furnace. Thallous nitrate has been found satisfactory in making up the batch. Since thallous compounds are volatile at relatively low temperatures, it is important to "bake" the batches at about 300° C. for about one hour to insure the initial reactions between the ingredients, so that thallous compounds will not be present in free forms, thereby lessening or eliminating the volatilization loss. These glasses melt at temperatures between 900° and 1400° C., the approximate temperatures for the particular examples given being shown in Table II. Usually batches containing large amounts of silica or alumina require high temperature for melting (1400° C.) and those containing relatively large amounts of thallium lower the melting temperatures.

In the systems of Table I, an average temperature of about 1050° C. is sufficient for melting. In each system, in practice, a minimum temperature of melting should be experimentally determined for individual formulas and used whenever possible to lessen the volatilization loss of thallium and solution of the material of the high-silica container. The molding temperatures of the glasses are between 300–650° C. depending on the composition.

Most of the glasses, particularly those with low alkali content, are durable against moisture attack. The glasses having a high thallium content have a distinct yellow tint.

Having thus dscribed my invention, what I claim is:

1. An optical glass consisting of the heat-reaction product of a batch consisting of compatible oxides, at least ninety per cent by weight of which consists of silica, thallous oxide, and titanium dioxide.

2. An optical glass composition consisting by weight of thallous oxide, 64 to 91 per cent; titanium dioxide, 5 to 20 per cent; silica, 4 to 28 per cent.

3. An optical glass composition comprising essentially by weight: thallous oxide, 40 to 91 per cent; silica, 4 to 30 per cent; oxide selected from the group consisting of the oxides of sodium and potassium and mixtures thereof, 0 to 10 per cent; aluminum oxide, 0 to 10 per cent; boron oxide, 0 to 15 per cent; oxide selected from the group consisting of the oxides of titanium, columbium, and tantalum, and mixtures thereof, 5 to 20 per cent.

4. An optical glass composition comprising essentially by weight: thallous oxide, 40 to 55 per cent; titanium dioxide, 20 to 28 per cent; silica, 14 to 30 per cent; oxide selected from the group consisting of the oxides of sodium and potassium, and mixtures thereof, 5 to 10 per cent.

KUAN-HAN SUN.

REFERENCES CITED

The following references are of record in the file of this patent:

UNITED STATES PATENTS

| Number | Name | Date |
|---|---|---|
| 1,607,817 | Dennis | Nov. 23, 1926 |

OTHER REFERENCES

Ser. No. 395,364, Berger et al. (A. P. C.), published May 11, 1943.